F. V. DETWILER.
ELECTRIC COOKING APPARATUS.
APPLICATION FILED JUNE 29, 1912.

1,219,926.

Patented Mar. 20, 1917.
9 SHEETS—SHEET 1.

Witnesses:
H. S. Gaither
Geo Lupin

Inventor:
Forest V. Detwiler

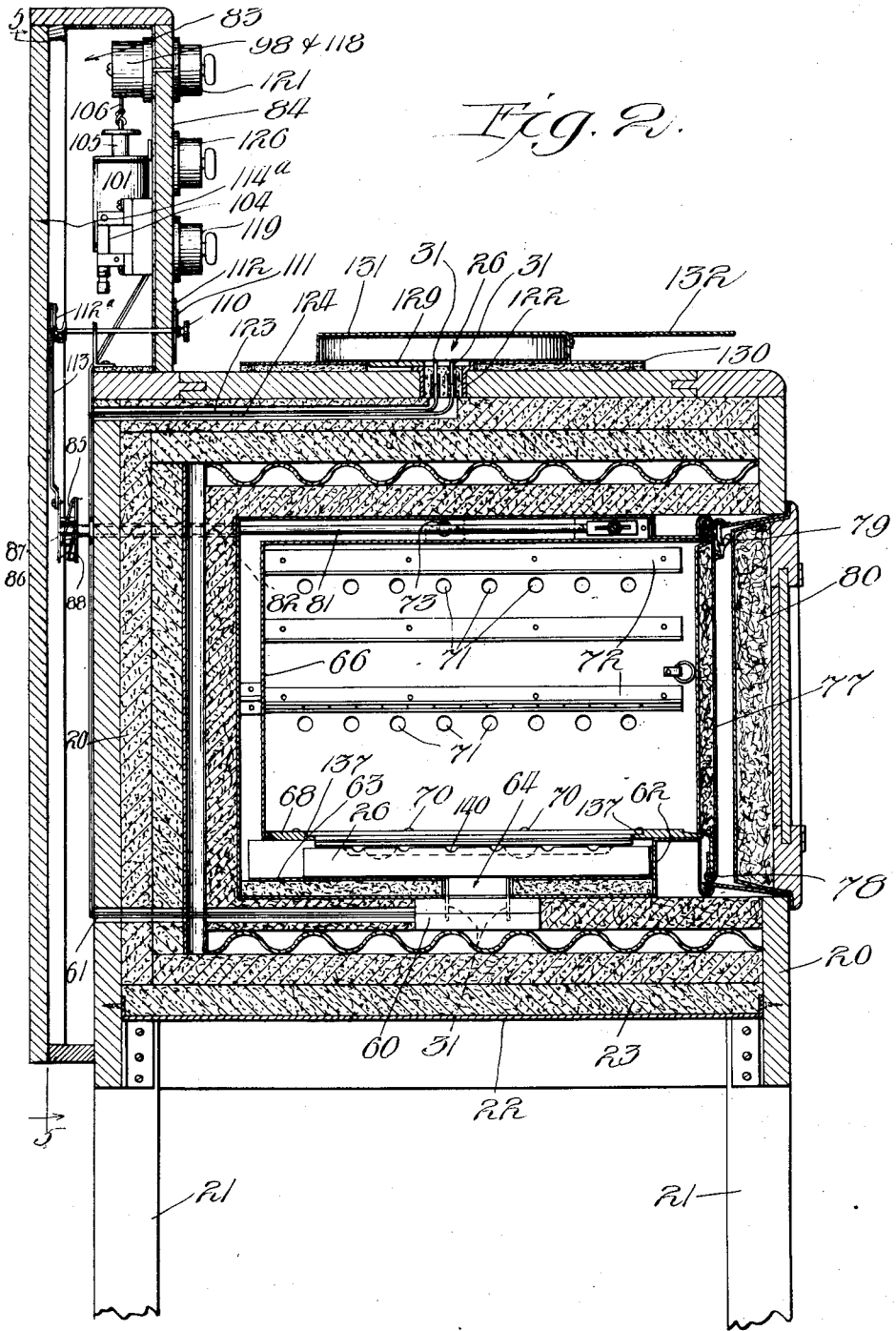

F. V. DETWILER.
ELECTRIC COOKING APPARATUS.
APPLICATION FILED JUNE 29, 1912.
1,219,926.
Patented Mar. 20, 1917.
9 SHEETS—SHEET 3.
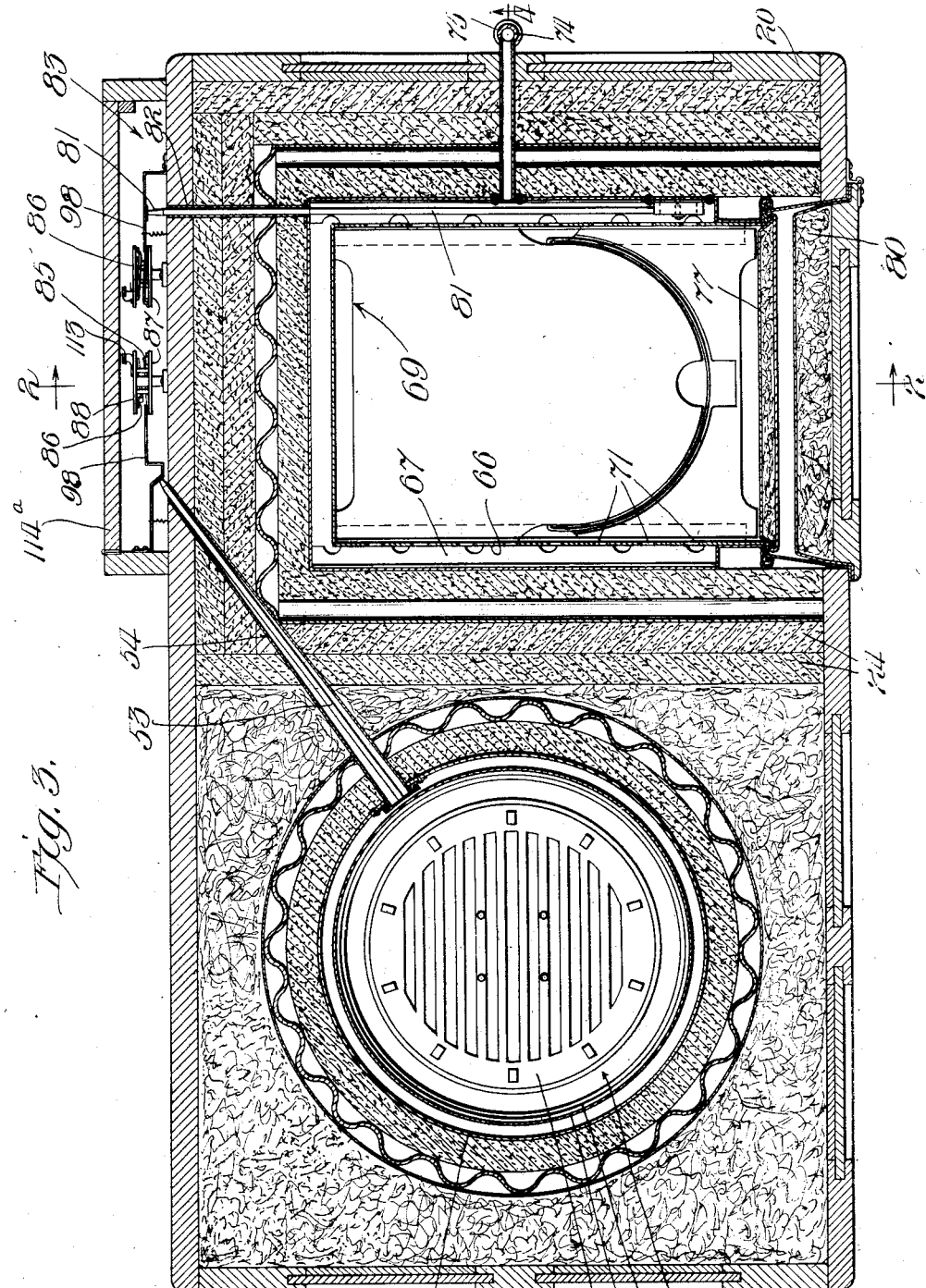
Witnesses:
H. S. Gaither
Geo Lupen
Inventor:
Forest V. Detwiler F. V. DETWILER.
ELECTRIC COOKING APPARATUS.
APPLICATION FILED JUNE 29, 1912.
1,219,926.
Patented Mar. 20, 1917.
9 SHEETS—SHEET 4.
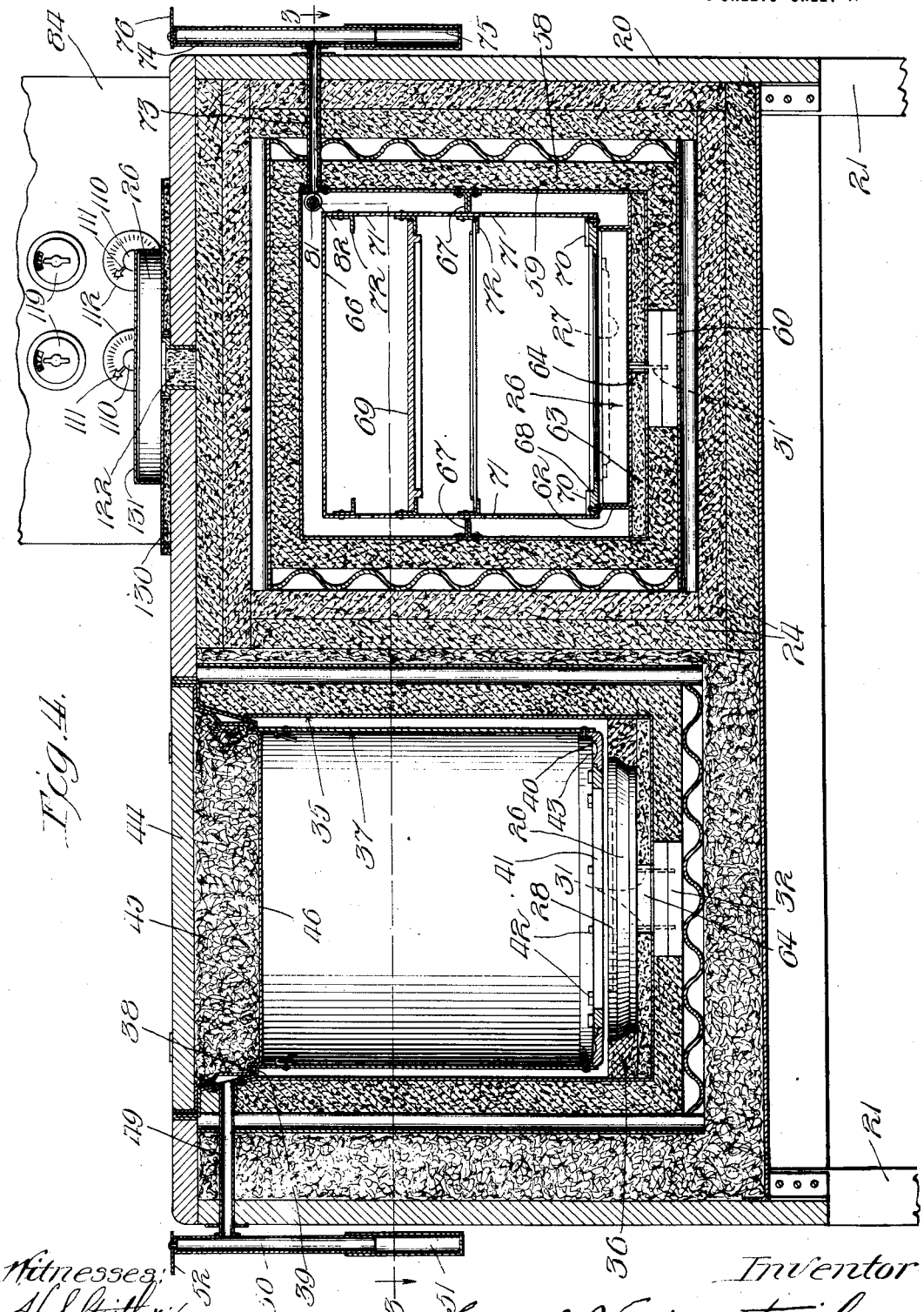

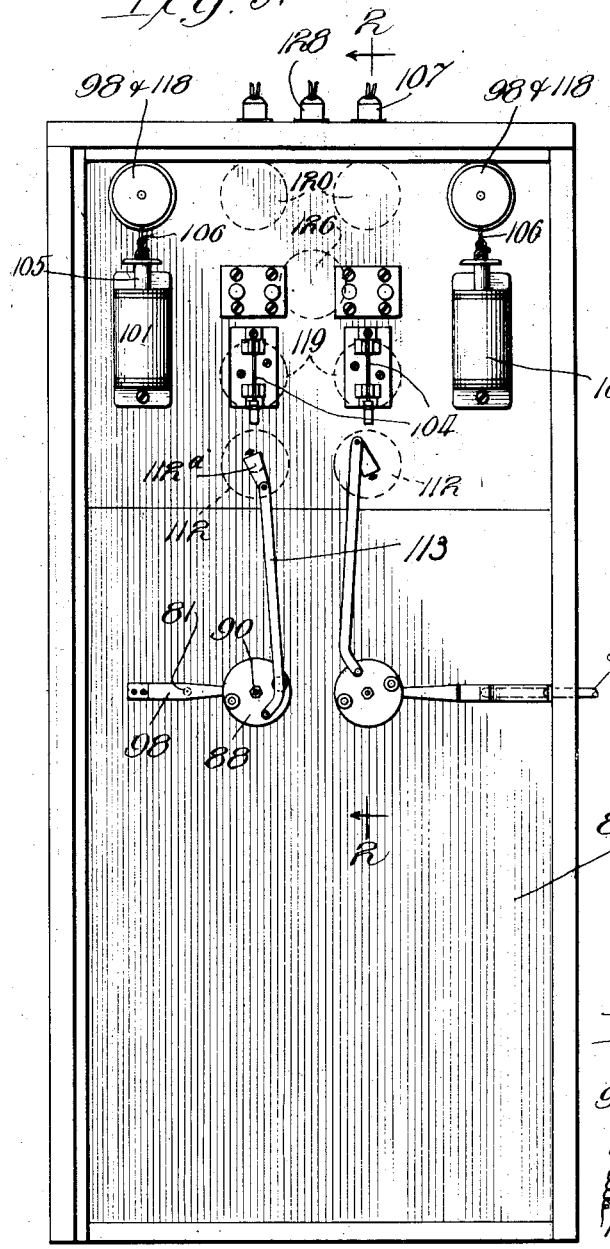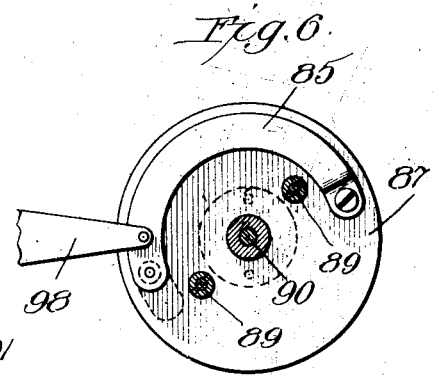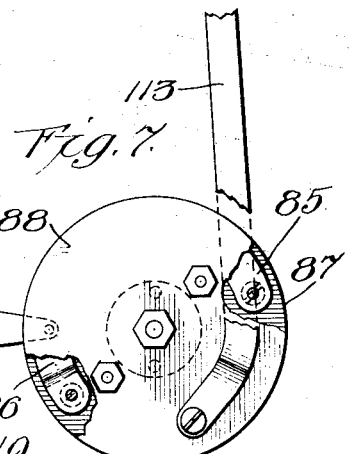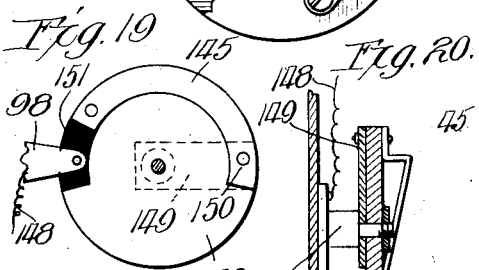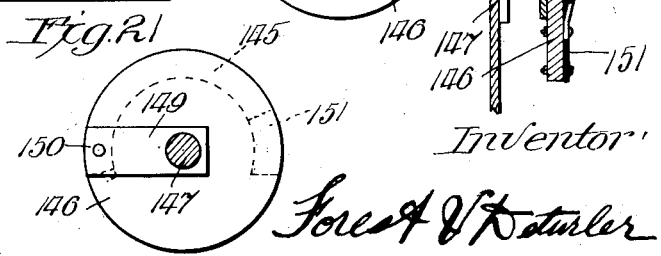

F. V. DETWILER.
ELECTRIC COOKING APPARATUS.
APPLICATION FILED JUNE 29, 1912.
1,219,926.
Patented Mar. 20, 1917.
9 SHEETS—SHEET 6.
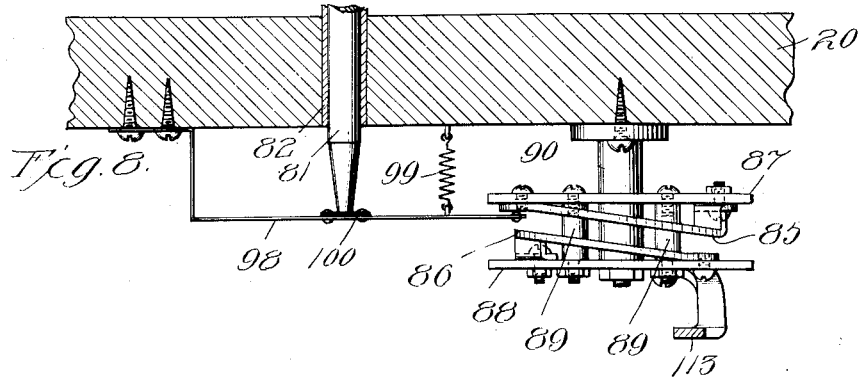
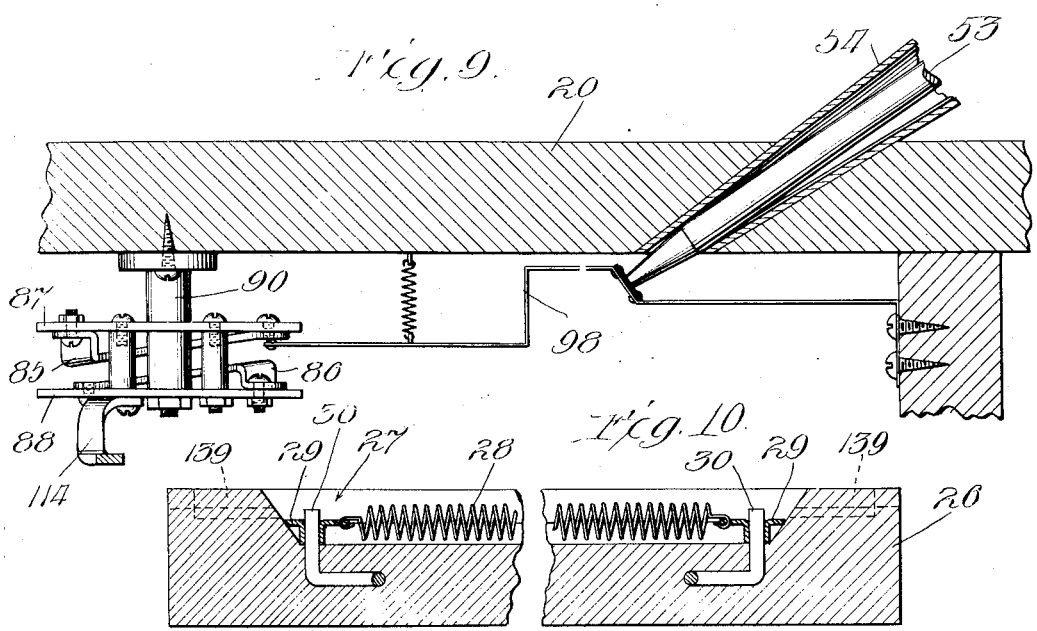
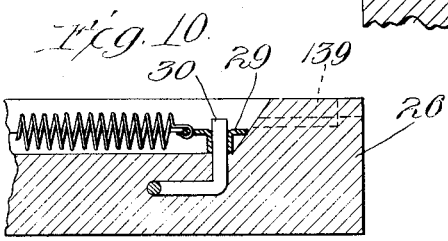
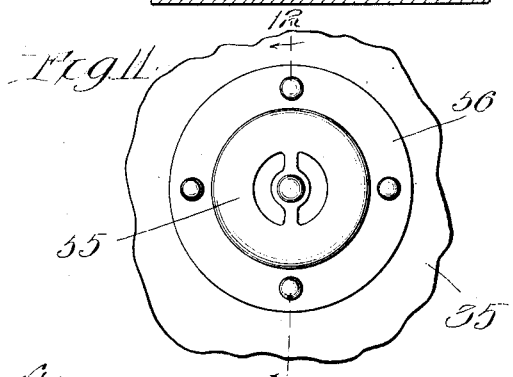
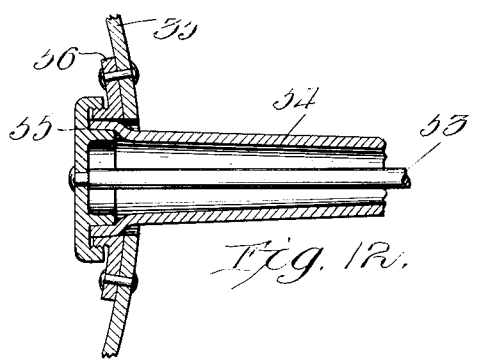
Witnesses:
Inventor:
Forest V. Detwiler F. V. DETWILER.
ELECTRIC COOKING APPARATUS.
APPLICATION FILED JUNE 29, 1912.
1,219,926.
Patented Mar. 20, 1917.
9 SHEETS—SHEET 7.
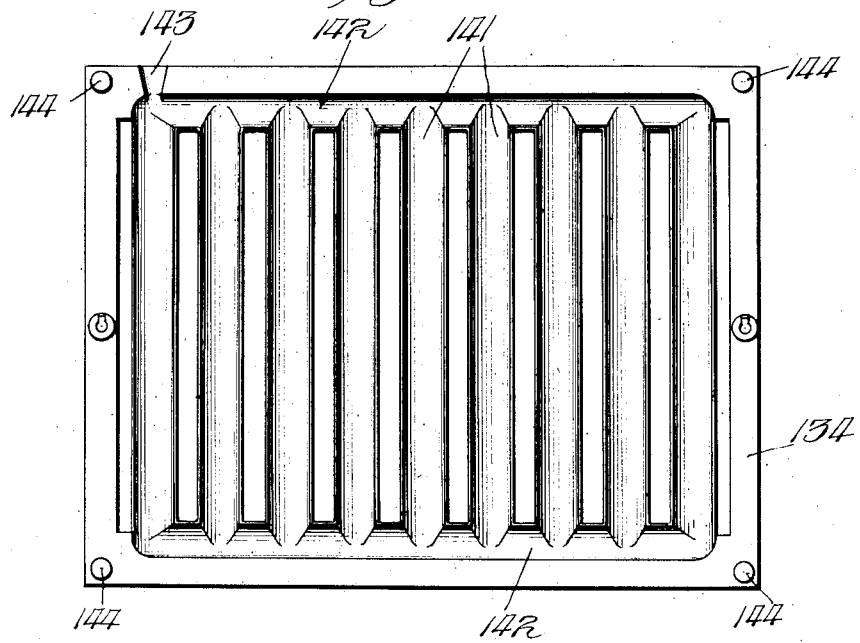
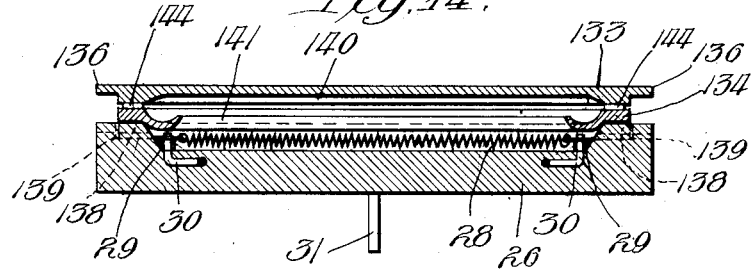
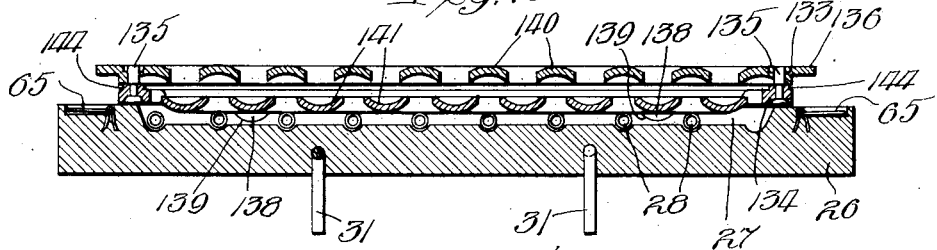
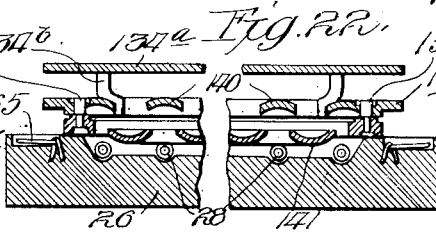

F. V. DETWILER.
ELECTRIC COOKING APPARATUS.
APPLICATION FILED JUNE 29, 1912.
1,219,926.
Patented Mar. 20, 1917.
9 SHEETS—SHEET 8.
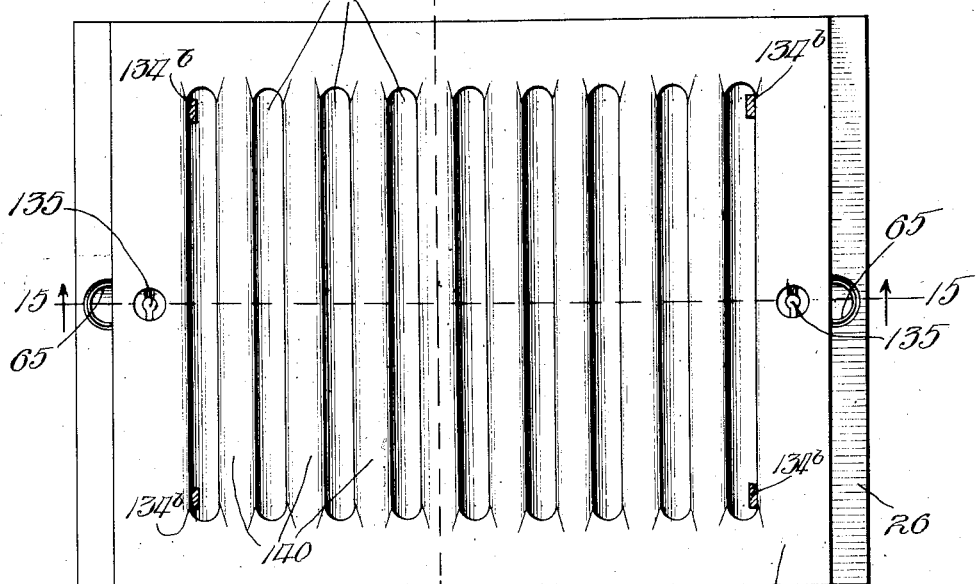
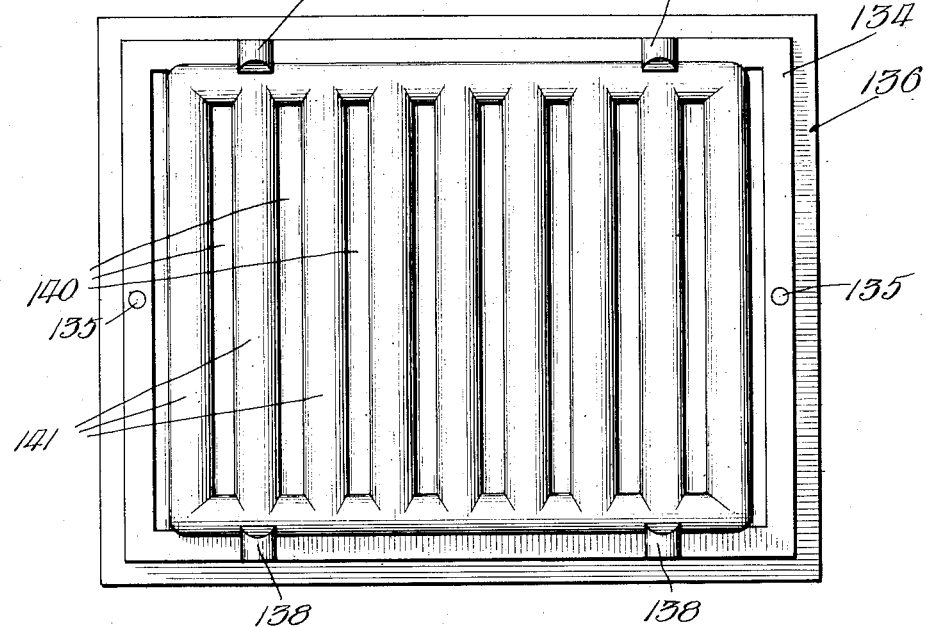
Witnesses:
H. S. Gaither
Geo Lyon
Inventor:
Forest V. Detwiler

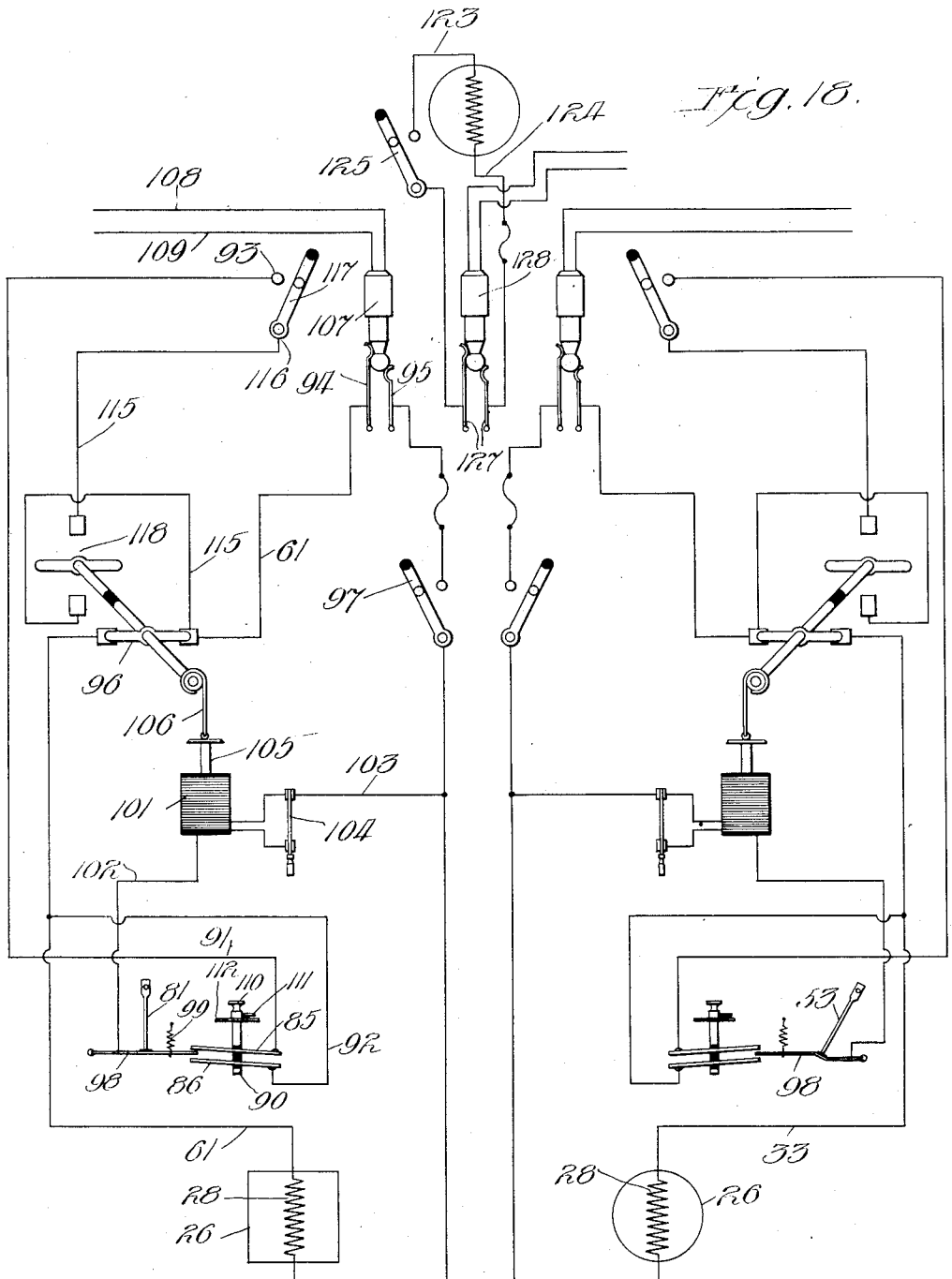

UNITED STATES PATENT OFFICE.

FOREST V. DETWILER, OF CHICAGO, ILLINOIS.

ELECTRIC COOKING APPARATUS.

1,219,926.        Specification of Letters Patent.      Patented Mar. 20, 1917.

Application filed June 29, 1912. Serial No. 706,581.

*To all whom it may concern:*

Be it known that I, FOREST V. DETWILER, a citizen of the United States, residing at Chicago, in the county of Cook and State of Illinois, have invented certain new and useful Improvements in Electric Cooking Apparatus, of which the following is a specification.

This invention relates to improvements in electric cooking apparatus and one of the objects of the invention is to provide an improved apparatus of this class having means for automatically controlling or regulating the temperature thereof.

A further object is to provide an improved simple, durable and cheap apparatus of this class which is adapted to be heated by means of heater plates or elements separate therefrom and which is also provided with means, such as resistance, whereby electricity may be employed as a heating medium.

Other and further objects will appear from the following specification and appended claims in connection with the accompanying drawings, in which—

Fig. 2 is a vertical sectional view as taken on line 2—2, Figs. 3 and 5;

Fig. 3 is a horizontal sectional view taken on line 3—3, Fig. 4;

Fig. 4 is a vertical sectional view taken on line 4—4, Fig. 3;

Fig. 5 is a view taken on line 5—5, Fig. 2;

Fig. 6 is a view partly in elevation and partly in section of one of the adjustable contact members;

Fig. 7 is a view partly in elevation and partly broken away of the other adjustable contact member;

Fig. 8 is a view partly in elevation and partly in section, showing the adjustable contact members and the thermostatic heat controlling elements;

Fig. 9 is a view similar to Fig. 8, showing another form of thermostatic controlling element;

Fig. 10 is a view partly in section and partly in elevation of one of the electric heater elements;

Fig. 11 is a view in elevation of a detail.

Fig. 12 is a sectional view taken on line 12—12, Fig. 11.

Fig. 13 is a top plan view of the lower section of the boiler.

Fig. 14 is a sectional view taken on line 14—14, Fig. 16, and showing the broiler in connection with the electric heater element, the latter being partly in section.

Fig. 15 is a view similar to Fig. 14 taken on line 15—15, Fig. 16.

Fig. 16 is a top plan view of Figs. 14 and 15.

Fig. 17 is a bottom plan view of the parts shown in Fig. 16.

Fig. 18 is a diagram of the electric circuits.

Fig. 19 is a front elevation of a modified form rotatable contact member;

Fig. 20 is a longitudinal sectional view of the contact member shown in Fig. 19;

Fig. 21 is a rear elevation of the contact member shown in Fig. 19.

Fig. 22 is a view similar to Fig. 15 showing a heat deflector plate attachment for the broiler.

Figure 1:
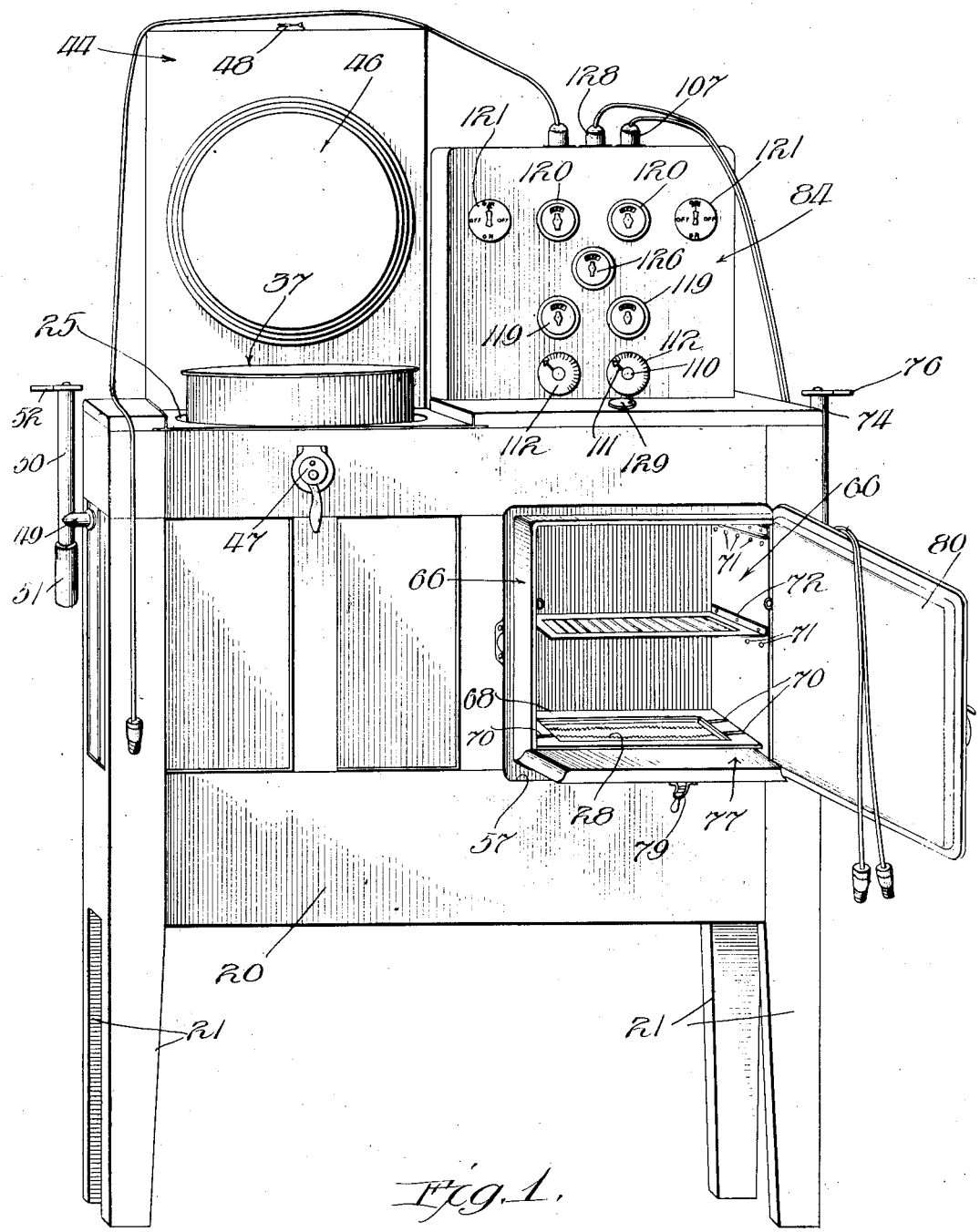
Figure 1 is a perspective view of an improved apparatus of this class constructed in accordance with the principles of this invention.

In the drawings the numeral 20 designates generally an inclosing casing which may be of any desired size and configuration and constructed of any suitable material, but in the present form of the invention, the casing is rectangular in cross section and is supported at any convenient elevation above the floor by suitable legs 21. Supported by the bottom 22 of the casing is suitable insulating material 23, and insulating material 24 is arranged vertically to form a partition to divide the casing into two parts. One of these parts is shaped to form a compartment opening through the top of the casing as at 25 (see Figs. 1 and 4) and having a surrounding insulating wall. Within this compartment and at the bottom thereof is arranged a removable electric heater element designated generally by the reference numeral 26 and comprises a body having a recessed portion 27 (Fig. 10) in its upper face within which recess is removably arranged resistance 28, such as coils. To the ends of each coil are secured sockets 29 which engage over lugs or posts 30 having one portion embedded in the body 26 so that one end of each will project into the recess 27 as shown. The other ends of two of these posts project through the bottom of the body portion 26, as at 31 (Figs. 14 and 15) to form contacts adapted to enter sockets in the portion 32 in the bottom of the compartment 25 and which sockets are connected with the conductor wires 33, 34 (see Fig. 18), so that when the heater element is in position as shown in Fig. 4 and the circuit is closed through the conductor wires, the resistance 28 will be heated, as will be understood. The compartment 25 may be lined with any suitable material 35, such as metal or the like, and the element 26 may be of a size to substantially fill the bottom of the compartment being held out of contact with the wall by means of insulating material 36.

A removable receptacle 37 for holding the cooking receptacle is arranged in the compartment and is of a size in cross section preferably slightly less than the compartment so as to form a space between the receptacle and the wall of the compartment. The receptacle is supported by means of a flange 38, which rests upon a shoulder 39 formed on the wall of the compartment and the receptacle is of such a length so that when in position its bottom will be spaced slightly above the heater element 26. The bottom of the receptacle is sectional in construction for a purpose to be set forth, and comprises a portion 40 having an opening through its center within which opening is arranged a removable grate section 41 (see Figs. 3 and 4) having projections 42 extending above its upper face which projections serve to hold the bottom of a vessel out of contact with the face of the grate to permit a free circulation of heated air under the vessel. The removable grate 41 is provided so that when an electric current is not available for heating the resistance 28, the grate may be removed and an imperforate plate substituted therefor to close the bottom of the receptacle thereby enabling the user to make use of heater plates in the receptacle, as is well known in this art, and which heater plates are not illustrated.

The portion 40 of the bottom of the receptacle may be provided with an open recess or pocket 43 for receiving any liquid or water of condensation which may accumulate in the receptacle. A closure 44 having insulation 45 secured thereto is provided for the compartment 25, and a metallic covering 46 is provided for the insulation so that when the closure 44 is closed, it will also serve as a closure for the receptacle 37. Fastening means 47, 48 may be provided for locking the closure 44 when closed. In order to carry off any vapor which may accumulate in the compartment 25 there is provided a tubular member 49 which passes through the wall of the casing and compartment and leads to the outside of the casing, at which latter point it is connected with another tubular member 50 having an open bottom and to which is removably secured a section 51 forming a receptacle for water of condensation. The other end of the member 50 is open and is provided with a damper or closure 52 which may be readily adjusted to open or close such end.

The temperature within the compartment 25 is automatically controlled in a manner to be hereinafter described by means of a thermostatic rod or bar 53 (see particularly Figs. 3, 9, 11 and 12) which passes through a casing 54 having communication with the interior of the compartment 25 and passing through the casing 20. The rod is supported out of contact with the casing 54 preferably by means of an open cap 55, which in turn is supported by a collar 56 secured to the wall 35 of the compartment 25, so that the heated air in the compartment will readily enter the casing 54. The portion of the casing 54 adjacent the compartment is considerably larger than the rod to permit the heated air to surround and contact with the rod, while the portion of the casing 54 adjacent the other end of the rod is only of a size to permit the rod to move freely, so that the heated air will not escape through the casing. Thus the temperature in the compartment 25 will cause the rod or bar to expand and contract, which movements will control the supply of electric current to the resistance 28 in a manner as will be hereinafter set forth. Within the other part of the casing 20 is arranged an oven which opens through the front of the casing as at 57 (see Figs. 1, 2 and 3), the oven compartment being formed of insulating material 58 lined with any suitable material 59, such as metal. Arranged in the bottom wall of this compartment is a socket member 60 similar to the socket member 32 and to the sockets therein are connected the conductor wires 61 leading through the casing 20. A frame 62 is arranged within the compartment and supported by insulating material 63 which latter is provided with an opening 64 arranged above the socket element 60 and the frame is preferably of a size somewhat less than the compartment so that the frame will be spaced from the upright walls of the oven. A heater element 26 is placed in this frame so that the contacts 31 will pass through the opening in the insulation 63 and enter the sockets in the element 60. Obviously the frame 62 may be of any desired configuration and the heater element will be of a configuration to conform to the frame. Lifting devices 65 may be provided on the element 26 and these are mounted to stand flush or below the top of the body of the element when not in use (see Fig.

15). A removable receptacle 66 is arranged in this compartment and is of a size somewhat smaller than the compartment so as to be spaced from the walls thereof. The bottom of the receptacle rests upon the frame 62 and the sides are held spaced from the sides of the compartment by means of spacing devices 67 which latter are preferably provided with openings therethrough so as not to interrupt the circulation of heated air about the receptacle. The bottom 68 of the receptacle 66 is provided with an opening therethrough (see Figs. 1, 2 and 4) over the resistance 28, which opening is adapted to be closed by a grate or imperforate plate, according to whether the resistance is used to supply the heat, or the heater plates 69. Ribs 70 are provided on the bottom 68 to support a heater plate 69 out of contact with the entire surface of the bottom and thereby insure that the heater plate will not dissipate its heat so readily but will remain heated for a greater length of time. The side walls of the receptacle 66 are provided with openings 71 and shelf supports 72 which supports may also serve to support the heater plates 69 when the latter are employed.

The vapors which pass from the receptacle 66 through the openings 71 and into the compartment are carried from the latter by means of a tube 73 leading from the compartment and through the wall of the casing 20 where it is connected with an upright tube 74 intermediate the ends of the latter. To the bottom of the tube 74 is removably connected a receptacle 75 for receiving the water of condensation and to the other end of the tube 74 is connected a closure or damper 76 for opening and closing the tube 74. A closure 77 is provided for the receptacle 66 and is hinged as at 78 to fold downwardly as shown in Fig. 1, to form a support for vessels, etc., and a catch 79 locks the closure 77 against opening. The outer casing 20 is also provided with a closure 80 for the opening 57.

When the resistance is employed for supplying the heat, the temperature in the receptacle 66 is controlled automatically by regulating the supply of electric current and is accomplished by means of a thermostatic rod or bar 81, in a manner to be set forth, and which bar is arranged and supported so that a portion thereof will be located within the compartment and in a manner that it will be contracted and expanded by the fluctuations of the temperature. One end of the bar is free and passes through a casing 82 communicating with the compartment and leading through the wall of the outer casing 20. This bar is similar to the bar or rod 53 and they are so arranged with respect to each other, that their free and projecting ends will be located in close proximity to each other, so that the circuit controlling mechanisms may be compactly arranged.

The mechanism for automatically controlling the circuits by means of the rods 81, 53 will now be described. Arranged preferably at the rear of the casing 20 and within a housing 83, a portion 84 of which projects above the casing 20 to form a support for the various switch plugs and dials, are two pairs of spaced coöperating contacts 85, 86, and as the construction and operation of each pair is the same, the specific description of one will apply to them both. The contacts of each pair are always maintained in the same relative position and are respectively secured to supports 87, 88 (see Figs. 8 and 18) secured together by spacing members 89, and are rotatable about a pivot member 90. These contacts are each provided with a high and a low portion formed by projecting the contacts from their supports for varying the distances lengthwise of the contacts and with the high portion of one adjacent and opposed to the low portion of the other and to these contacts are respectively connected the electrical conductor wires 91, 92, one of which conductors, the conductor 92, is connected with the conductor 61 and is in the circuit with the resistance 28. The other conductor 91 leads to a contact 93. The conductor 61 is connected with a contact 94, of a pair of contacts 94, 95 and to the other contact 95 is connected the conductor 62 leading to the other side of the resistance 28. Arranged in the conductor 61 is a switch 96, and arranged in the conductor 62 is a switch 97.

A contact member 98 is mounted upon a suitable support in such a manner that one end thereof will project between the contacts 85, 86 and an elastic member 99 may be provided for normally holding the member 98 in contact with the contact 85. The thermostatic rod 81 is arranged to engage an insulated portion 100 of the contact member 98 and so that when the rod is contracted the member 98 will engage the contact 85, but when the rod expands, it will move the member 98 out of engagement with the contact 85 and into engagement with the contact 86. A solenoid magnet 101 of the usual type wound for an A. C. and a D. C. is connected at one end by means of a conductor 102 to the contact member 98 and at its other end by a conductor 103 with the conductor 62 forming a shunt around the resistance 28 and a switch 104 is provided for controlling the different windings of the solenoid magnet. This magnet is of the ordinary and well known type and forms no part of this invention. A core 105 is controlled by the magnet and this core is connected as at 106 with the rotary switch 96. The plug 107 is connected with the main line conductors 108, 109 and is adapted to be inserted between the contacts 94, 95. Assuming the plug 107 to be in position as shown in Fig. 18, the switch 96 closed, and the contact member 98 to be in engagement with the contact 85, the magnet 101 will be deenergized. When the main line switch 97 is closed, the circuit will be as follows: from plug 107, through contact 95, through switch 97, conductor 62, resistance 28, conductor 61, switch 96, and contact 94 back to main line.

When the temperature in the compartment in which the resistance is located has risen sufficiently to cause the thermostatic rod 81 to move the contact member 98 out of engagement with the contact 85 and into engagement with the contact 86, there will be a shunt circuit from conductor 62, through conductor 103, switch 104, magnet 101, conductor 102, contact member 98, contact 86, and conductor 92 back to conductor 61. This will energize the magnet, causing it to operate the core 105, the operation of which latter will open the switch 96, and thereby break the circuit from the main line through the resistance 28. Thus it will be seen that when the temperature reaches a pre-determined point the circuit will be automatically cut off.

When the tempertaure lowers, the thermostatic bar 81 will contract, and the elastic member 99 will move the contact arm 98 out of engagement with the contact 86 and back into engagement with the contact 85, thereby cutting out the shunt circuit and the magnet 101, which will permit the switch 96 to be again closed at the will of the operator.

The temperature at which the magnet 101 will be thrown into circuit and consequently the switch 96 operated, may be varied by rotating the contacts 85, 86 about their pivot 90 and with respect to the end of the contact member 98, thereby varying the extent of movement necessary for the thermostatic bar 81. For insance, as shown in Fig. 8, the high portion of the contact 86 is adjacent the contact member 98 and therefore, a slight expansion of the thermostatic bar 81 is only necessary to cause the member 98 to contact with 86. If, however, the low portion of the contact 86 is moved to a point adjacent the contact member 98, it will be manifest that a greater expansion of the thermostatic bar is necessary to cause the member 98 to engage the contact 86. Therefore, it will be seen that the position of the contacts 85, 86 with relation to the member 98 controls the degree of temperature necessary before the magnet 101 will be energized. This adjustment of these contacts may be accomplished in any suitable manner, but preferably from the front of the casing (see Figs. 1, 2 and 5) by means of an operating handle 110, to which is connected a pointer 111, coöperating with a dial or indicator 112 upon which is indicated the degrees of temperature, which correspond with the relative position of the contacts 85, 86. The handle is provided with a crank arm 112$^a$ which latter is connected by a link 113 with one of the supports 87, 88 so that when the handle is rotated, the contacts will be correspondingly rotated. The solenoids, contacts and switches are all located within the housing 83 and the latter is provided with a suitable closure 114$^a$ for protecting and concealing them.

In order to automatically reëstablish the circuit through the resistance 28 by closing the switch 96 when the temperature falls, the contact 85 is employed in connection with the contact member 98. This is accomplished by means which will now be described: A conductor 115 leads from the conductor 61, preferably from one of the poles of the switch 96 to a contact 116 which coöperates with the contact 93 and with which contacts 93, 116 a switch 117 coöperates. Another switch 118 is arranged in the conductor 115 and is connected with the switch 96 in such a manner that when the switch 96 is open the switch 118 will be closed and vice versa. The double switch thus employed is of the ordinary and well known rotary spring snap type construction and in which the controlling element of the switch is rotated in the same direction to turn the switch on or off. This is accomplished by means of a rotary spring controlled element which is connected with the switch by means of a clutch. The element 106 is in the form of a flexible member and forms a connection between the core 105 of the solenoid and the rotary element; the spring which controls the element tends to rotate the element in a direction to position the clutch with respect to the switch and to wind the element 106 one or more times thereon so that when the magnet is energized the core will be attracted and will tend to unwind the connection 106 from the element to cause the latter to rotate in a direction to wind up the spring. This will cause the switch to be rotated. As soon as the magnet is deënergized, the spring which controls the rotary element of the switch will operate upon the latter to rotate it in the opposite direction thereby winding the connection 106 therearound and positioning the clutch so that the next time the magnet is energized the switch will be again operated in the same direction.

This construction however is well known in the art and inasmuch as it forms no specific part of this invention it is not specifically illustrated.

Assuming now that the parts are in the position shown at the left in Fig. 18 with the switch 97 closed, the circuit will be the same as just traced. Assuming now, however, that the switch 117 as well as the switch 97 are closed and the switch 118 is open, as shown, the circuit will still be the same and will continue the same until the contact member 98 engages contact 86 and energizes magnet 101. This will cause the solenoid to open the switch 96 and close the switch 118, and when the member 98 contacted with 85, the main line circuit instead of being cut off as before, would take the following path: from contact 95, through switch 97, conductor 103, switch 104, magnet 101, conductor 102, contact member 98, contact 85, conductor 91, switch 117, switch 118, conductor 115, conductor 61, contact 94 back to main line. This would energize the magnet 101 again to operate the core 105, which in turn would open the switch 118 and close the switch 96, after which the circuit would be through the switch 96 instead of through the switch 118. Thus it will be manifest that by the operation of the switch 117, the apparatus may be set to operate in the manner desired by the operator. The circuits for the other compartment operate in the same manner.

Switch buttons 119 are provided on the portion 84 of the casing for the switches 97, and similar switch buttons 120 are provided for the switches 117, while the switch buttons 121 are provided for the double switches 96, 118 and are properly marked to indicate the positions of the respective switches. Arranged in the top of the casing 20, preferably adjacent the upwardly extending portion 84, is a socket 122 to which conductors 123, 124 (see Figs. 2 and 18) are connected and these conductors are also connected to a switch 125 controlled by a switch button 126 (Fig. 1) arranged on the portion 84 in a convenient position for the operator. Spaced contacts 127 are arranged in the circuit thus formed and between which contacts a line plug 128 is adapted to be inserted. The plug 122 is provided with a cover 129 adapted to protect the sockets therein when not in use and to be swung out of the way when it is desired to use the sockets. This socket plug is of the ordinary and well known construction and forms no part of the present invention. An insulated protector 130 is provided and adapted to be placed upon the top of the casing 20 and is itself provided with an opening through which access may be had to the plug socket. When desired the heater element 26 may be removed from one of the cooking compartments or another heating element employed, and placed upon the protector as shown in Figs. 2 and 4, so that the portions 31 will enter the sockets in the plug 122, through the opening in the protector. A combined skillet and griddle 131 is employed with the heating element thus placed and is so constructed that the outer face of the bottom, when in the position shown in Figs. 2 and 4, will serve as a griddle and the element will then be housed in the inverted skillet. When desired to use the skillet it is inverted from the position shown and then the bottom will rest upon the heating element. A handle 132 is provided for handling the skillet and griddle. The opening in the protector is large enough to permit the ready manipulation of the cover 129. If desired, the protector 130 may be made removable or as a part of the casing 20.

For baking in the receptacle or oven 66, an imperforate plate is employed to close the opening in the bottom 68, but for broiling purposes the broiler shown in Figs. 13 to 17 is provided and comprises an upper and a lower member 133, 134, which are constructed of any suitable material and are detachably secured together in any suitable manner such as by means of fastening devices 135 so that the parts may be readily separated to enable then to be readily cleaned. The upper member 133 is shaped to form projecting flanges 136 adapted to rest upon shouldered portions 137 (see Fig. 2) so that the lower face of the lower member 134 will rest upon the element 26. The member 134 is provided with lugs 138 adapted to enter recesses 139 in the element (see Fig. 14) and the element is preferably provided with openings 140ª (see Figs. 2 and 15) to permit some of the heated air to escape therethrough. The members 133, 134 are shaped to respectively form spaced cross bars 140, 141, each of which is arched transversely. The bars of one member are opposed to the bars of the other members and are so arranged that the bars of one member will stand opposite the space between two adjacent bars of the other member. The convexed faces of the bars of the upper member are arranged uppermost to receive the article to be cooked while the concaved faces of the bars of the lower member are arranged uppermost to catch the drippings, and these lower bars will also prevent the drippings from falling on to the heater element.

The ends of the channels formed by the bars 141 in the lower member are connected by channels 142, (see Fig. 13) and an outlet opening 143 leads from one of the channels 142 and through the face of the member for the purpose of pouring off any liquid which may have accumulated in the channel bars. Spacing lugs 144 are provided preferably on the member 134 for holding the members 133, 134 slightly spaced.

With this improved apparatus, it will be seen that different cooking operations may be carried on at the same time in the different compartments, each compartment being provided with its own source of supply of heat and each being provided with its own automatic heat regulator. Furthermore, the open bottom of each of the cooking receptacles may be closed with an imperforate plate and heated plates employed instead of the electric heater elements.

Instead of the double rotary contacts 85, 86, shown in Fig. 8, between which contacts the contact member 98 operates, a single contact member 145 shown in Figs. 19 to 21, may be employed and in that event the magnet 101 may be dispensed with. The support 146 is rotatably mounted upon a pivot 147 to which is connected a conductor 148 corresponding with the conductor 61 in Fig. 18, and the contact 145 is electrically connected with the support 147 through the medium of a metallic member 149 and connecting screw 150. The conductor 148 is also connected with the contact member 98 and the contact member 98 and contact 145 form a circuit breaker which is operated or controlled by the thermostatic rod 81. When the rod is contracted, the contact member 98 will contact with the contact 145, and the current will flow through the resistance, but when the rod expands sufficiently the contact member will be moved out of engagement with the contact 145 and the circuit will be broken to cut out the resistance. The temperature at which the circuit will be broken may be varied in the same manner as with the double contacts 85, 86 by rotating the support 146. When it is desired to cut out the main line current, the support 146 and contact 145 are rotated sufficiently to bring an insulated portion 151 adjacent the contact member 98 so that when the rod 81 is contracted, the contact member will engage and rest against the insulation 151, which is formed on the same face of the support 146 to which the contact 145 is secured.

In Fig. 22 is shown a deflector plate 134ª which is provided with supports 134ᵇ having shoulders thereon, and the extremities of these supports are adapted to enter openings in the broiler so that the shoulders will rest upon a portion of the broiler to removably support the deflector plate and hold the same spaced a distance above the top of the broiler. This deflector plate is provided for use in baking so that when a pan is placed in the oven should the broiler be in position, the pan will not close the openings in the broiler, but the support will hold the pan spaced above the broiler and thereby allow the heated air to enter the oven to be deflected by this deflector plate and thereby cause an equal distribution or circulation of the heated air in the oven.

Obviously many changes may be made in the details of construction and the arrangement of the parts, within the scope of the claims, without departing from the spirit of this invention. While in the specification and claims the term "switch" is employed in connection with elements 96 and 118, it is to be understood that this term is employed in its broadest sense to mean any form of device to "cut out" or make and break the circuit.

What is claimed as new is:

1. In a device of the character described, the combination of an electrical resistance, a circuit in which the resistance is included, a make and break device included in the circuit and embodying a rotatable support, a contact of some length secured thereto, said contact projecting from the support a varying distance lengthwise of the contact, a contact member movable into and out of engagement with the contact, thermostatic means for controlling the movement of the contact member, and means for rotating the support.

2. In a device of the character described, the combination of an electrical resistance, a circuit in which the resistance is included, a make and break device included in the circuit, and embodying a rotatable support, a contact of some length secured thereto, said contact projecting from the support a varying distance lengthwise of the contact, a contact member movable into and out of engagement with the contact, thermostatic means for controlling the movement of the contact member, means for rotating the support for presenting a different portion of the contact to the contact member, and indicating means for indicating the position of the said contact.

3. In a device of the character described, the combination of an electrical resistance, a circuit in which the resistance is included, a make and break device included in the circuit and embodying a rotatable support, a contact of some length carried by the support, said contact projecting a varying distance from the support lengthwise of the contact, and a contact member movable into and out of engagement with the contact, thermostatic means for moving the said contact member, and means for moving the support to vary the position of the contact relatively to the contact member and for also moving the contact out of engaging relation to the contact member.

4. In a device of the character described, the combination of an electrical resistance, a circuit in which the resistance is included, a make and break device included in the circuit and embodying a movable support, a contact of some length carried by the support, said contact projecting a varying distance from the support throughout the length of the contact, and a contact member movable into and out of engagement with the contact, thermostatic means for moving the said contact member, means for moving the support to vary the position of the contact relatively to the contact member and for also moving the contact out of engaging relation to the contact member, and indicating means for indicating the position of the said contact.

5. In a device of the class described, the combination of an electrical resistance, a circuit in which the resistance is included, a make and break device in the circuit, a branch circuit, a make and break device in the branch circuit, said make and break devices being insulated from each other and connected for simultaneous operation, and operating one to open when the other closes the respective circuits and means for operating the devices.

6. In a device of the class described, the combination of an electrical resistance, a circuit in which the resistance is included, a make and break device in the circuit, a branch circuit, a make and break device in the branch circuit, said make and break devices being insulated from each other and connected for simultaneous operation, and operating one to open when the other closes the respective circuits and means for automatically operating the devices.

7. In a device of the class described, the combination of an electrical resistance, a circuit in which the resistance is included, a switch in the circuit, a branch circuit, a switch in the branch circuit, means connecting the switches for simultaneous operation, said switches operating one to open when the other closes the respective circuits, and electro responsive means for operating the switches.

8. In a device of the class described, the combination of an electrical resistance, a circuit in which the resistance is included, a switch in the circuit, a branch circuit, a switch in the branch circuit, means connecting the switches for simultaneous operation, said switches operating one to open when the other closes the respective circuits, a shunt circuit, and means in said shunt circuit for operating the switches.

9. In a device of the class described, the combination of an electrical resistance, a circuit in which the resistance is included, a switch in the circuit, a branch circuit, a switch in the branch circuit, means connecting the switches for simultaneous operation, said switches operating one to open when the other closes the respective circuits, a shunt circuit, and an electro responsive device in said shunt circuit connected with the switches for operating them.

10. In a device of the class described, the combination of an electrical resistance, a circuit in which the resistance is included, a switch in the circuit, a branch circuit, a switch in the branch circuit, means connecting the switches for simultaneous operation, said switches operating one to open when the other closes the respective circuits, a shunt circuit, a magnet in the latter, and a core connected with the switches for operating them.

11. In a device of the class described, the combination of an electrical resistance, a circuit in which the resistance is included, a switch in the circuit, a branch circuit, a switch in the latter, means connecting the switches whereby when one is operated to open its circuit, the other will operate to close its circuit, electro responsive means for operating the switches, and thermostatic means for controlling the action of the said electro responsive means.

12. In a device of the class described, the combination of an electrical resistance, a circuit in which the resistance is included, a switch in the circuit, a branch circuit, a switch in the latter, means connecting the switches whereby when one is operated to open its circuit, the other will operate to close its circuit, electro responsive means for operating the switches, thermostatic means for controlling the action of the said electro responsive means, and an additional switch in the said branch circuit for cutting out the latter at will.

13. In a device of the class described, the combination of an electrical resistance, a circuit in which the resistance is included, a switch in the circuit, a branch circuit, a switch in the latter, means connecting the switches whereby when one is operated to open its circuit, the other will operate to close its circuit, electro responsive means for operating the switches, thermostatic means for controlling the action of the said electro responsive means, and means for varying at will the temperature at which the thermostatic controlling means will operate.

14. In a device of the class described, the combination of an electrical resistance. a circuit in which the resistance is included, a switch in the circuit, a branch circuit, a switch in the latter, means connecting the switches so that when one is operated to open its circuit, the other will operate to close its circuit, electro responsive means for thus operating the switches and thermostatic means for controlling the electro responsive means, said thermostatic means embodying spaced opposed contacts and a contact member operating between the contacts.

15. In a device of the class described, the combination of an electrical resistance, a circuit in which the resistance is included, a switch in the circuit, a branch circuit, a switch in the latter, means connecting the switches so that when one is operated to open its circuit, the other will operate to close its circuit, electro responsive means for thus operating the switches, thermostatic means for controlling the electro responsive means, said thermostatic means embodying spaced opposed contacts and a contact member operating between the contacts, said contacts and contact members being relatively adjustable to vary the temperature at which the contact member will engage the respective contacts, and means for thus adjusting the parts.

16. In a device of the class described, the combination of an electrical resistance, a circuit in which the resistance is included, a switch in the circuit, a branch circuit, a switch in the latter, means connecting the switches so that when one is operated to open its circuit, the other will operate to close its circuit, electro responsive means for thus operating the switches, thermostatic means for controlling the electro responsive means, said thermostatic means embodying spaced opposed contacts and a contact member operating between the contacts, said contacts and contact members being relatively adjustable to vary the temperature at which the contact member will engage with the respective contacts, means for thus adjusting the parts, and indicating means for indicating such adjustment.

17. In a device of the character described, the combination of an inclosing casing having a compartment therein opening through one of the upright walls thereof, the top of the casing being shaped to form a supporting surface, contacts within the compartment, a removable resistance element in the compartment, and additional contacts accessible through the supporting surface, said resistance element being interchangeable with the contacts to perform different cooking operations.

18. An electrical resistance element embodying a body having a chamber in the top thereof, terminals incased within the body, one end of the terminals projecting from the body and forming socket engaging plugs, and the other ends exposed and terminating in the said chamber, below the top of the chamber, and electrical resistance within the chamber below the plane of the top of the chamber, said resistance connected with the ends of the terminals within the chamber.

19. An electrical resistance element embodying a body having a chamber in the top thereof, terminals incased within the body, one end of the terminals projecting from the body and forming socket engaging plugs, and the other ends exposed and terminating in the said chamber, below the top of the chamber, and electrical resistance within the chamber below the plane of the top of the chamber, said resistance connected with the ends of the terminals within the chamber, the ends of each terminal being laterally offset one with respect to the other.

20. An electrical resistance element embodying a body having a chamber in the top thereof, terminals incased within the body, one end of the terminals projecting from the body and forming socket engaging plugs, and the other ends exposed and terminating in the said chamber, below the top of the chamber, and electrical resistance within the chamber below the plane of the top of the chamber, said resistance connected with the ends of the terminals within the chamber, the upper surface of the body being extended to form a supporting surface encompassing the resistance element.

21. An electrical resistance element embodying a body having a chamber in the top thereof, terminals incased within the body, one end of the terminals projecting from the body and forming socket engaging plugs, and the other ends exposed and terminating in the said chamber, below the top of the chamber, electrical resistance within the chamber below the plane of the top of the chamber, and sockets connected with the ends of the resistance and removably engaging over the ends of the terminals within the chamber.

22. An electrical resistance element embodying a body having a chamber in the top thereof, terminals incased within the body, one end of the terminals projecting from the body and forming socket engaging plugs, and the other ends exposed and terminating in the said chamber, below the top of the chamber, electrical resistance within the chamber below the plane of the top of the chamber, said resistance connected with the ends of the terminals within the chamber, and foldable lifting devices for the element recessed into the element.

23. The combination of a heating element, a broiler removably supported by the element, interengaging means between the body of the element and the said broiler for holding them against relative displacement.

24. The combination of an electric heating element, a broiler separate therefrom and removably supported thereby and interengaging means between the body of the element and the said broiler for holding them against relative displacement.

25. In an apparatus of the class described, the combination of an inclosing casing, a removable electrical heating element in the casing and a cooking receptacle also in the casing, the bottom of said receptacle having a removable portion above the said element.

26. In an apparatus of the class described, the combination of an inclosing casing, a removable electrical heating element in the casing and a cooking receptacle also in the casing, the bottom of said receptacle having a removable portion, the opening formed in the bottom by the said removable portion being disposed directly above the said resistance and through which opening the said element is removable from the casing.

27. In an apparatus of the class described, the combination of an inclosing casing, an electrical heating resistance in the casing and a cooking receptacle also in the casing, the bottom of said receptacle having a removable portion, there being projecting lugs extending above the upper face of the fixed portion of the bottom.

28. The combination of an inclosing casing, an oven in the casing, a grating in the bottom of the oven, a source of supply of heat disposed below the grating, and an imperforate deflector plate removably supported above the source of supply of heat.

29. The combination of an inclosing casing, an oven in the casing, a grating in the bottom of the oven, a source of supply of heat disposed below the grating, and an imperforate deflector plate removably supported above the source of supply of heat, said deflector plate being disposed within the oven.

30. The combination of an inclosing casing, an oven in the casing, a grating in the bottom of the oven, a source of supply of heat disposed below the grating, and a deflector plate having supports depending therefrom adapted to removably support the plate above the grating.

31. The combination of an inclosing casing, an oven in the casing, a grating in the bottom of the oven, a source of supply of heat disposed below the grating, and a deflector plate having supports depending therefrom, said supports being adapted to enter openings in the grating for removably holding the deflector in position and spaced above the grating.

32. The combination of an inclosing casing, an oven in the casing, a grating in the bottom of the oven, a source of supply of heat disposed below the grating, and a deflector plate having supports depending therefrom, said supports being adapted to enter openings in the grating and being provided with shoulders engaging the grating for removably holding the deflector plate in position and spaced above the grating.

33. The combination of an inclosing casing, an oven in the casing having an opening in the bottom thereof, a source of supply of heat below the opening, and an imperforate deflector removably supported above the supply of heat and adjacent the opening in the oven.

34. A make and break device for an electric circuit, embodying an adjustably mounted support, a contact of some length connected with the support and projecting therefrom at varying distances lengthwise of the contact, and a contact member movable into and out of engagement with the said contact.

35. A make and break device for an electric circuit, embodying a pivotally mounted support, a contact of some length connected with the support and projecting therefrom at varying distances lengthwise of the contact, a contact member movable into and out of engagement with the said contact, and means for moving the support about its pivot.

36. A make and break device for an electric circuit, embodying a pivotally mounted support, a contact of some length connected with the support and projecting therefrom at varying distances lengthwise of the contact, a fixed contact member movable into and out of engagement with said contact, means for moving the support about its pivot to vary the position of the contact with respect to the contact member, and means for indicating the position of the contact.

In testimony whereof I have signed my name to this specification this 24th day of June 1912 in the presence of two witnesses.

FOREST V. DETWILER.

Witnesses:
WILLIAM J. LEHMANN,
WARD N. CLARK.